US008837461B2

(12) United States Patent
Kodaka

(10) Patent No.: US 8,837,461 B2
(45) Date of Patent: Sep. 16, 2014

(54) TELEPHONY SYSTEM

(75) Inventor: Hiroshi Kodaka, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 1350 days.

(21) Appl. No.: 12/198,936

(22) Filed: Aug. 27, 2008

(65) Prior Publication Data

US 2009/0185553 A1 Jul. 23, 2009

(30) Foreign Application Priority Data

Jan. 21, 2008 (JP) .................................. 2008-009988

(51) Int. Cl.
| | |
|---|---|
| H04L 12/66 | (2006.01) |
| H04M 3/42 | (2006.01) |
| H04Q 3/00 | (2006.01) |
| H04L 29/06 | (2006.01) |
| H04L 29/08 | (2006.01) |
| H04W 4/02 | (2009.01) |

(52) U.S. Cl.
CPC ......... H04Q 3/0045 (2013.01); H04M 3/42348 (2013.01); H04M 2201/38 (2013.01); H04L 65/1046 (2013.01); H04L 65/1073 (2013.01); H04M 2207/18 (2013.01); H04L 67/18 (2013.01); H04W 4/02 (2013.01)
USPC ....................................................... 370/352

(58) Field of Classification Search
USPC ........................................................ 370/352
See application file for complete search history.

(56) References Cited

U.S. PATENT DOCUMENTS

| | | | | |
|---|---|---|---|---|
| 6,650,901 | B1 * | 11/2003 | Schuster et al. | ........... 455/456.1 |
| 7,738,634 | B1 * | 6/2010 | Sadot et al. | ..................... 379/45 |
| 7,940,746 | B2 * | 5/2011 | Livingood | ..................... 370/352 |
| 2004/0234049 | A1 * | 11/2004 | Melideo | ..................... 379/88.17 |
| 2006/0062367 | A1 * | 3/2006 | Christenson et al. | ..... 379/202.01 |
| 2006/0120517 | A1 * | 6/2006 | Moon et al. | ..................... 379/45 |
| 2006/0133582 | A1 * | 6/2006 | McCulloch | ..................... 379/45 |
| 2007/0064918 | A1 * | 3/2007 | Son | ..................... 379/355.01 |
| 2007/0121598 | A1 | 5/2007 | McGary | |
| 2007/0153773 | A1 | 7/2007 | Miyata et al. | |
| 2007/0286208 | A1 | 12/2007 | Kanada et al. | |

FOREIGN PATENT DOCUMENTS

| | | |
|---|---|---|
| CN | 1835533 | 9/2006 |
| CN | 1960399 | 5/2007 |
| CN | 1996961 | 7/2007 |
| CN | 101090324 | 12/2007 |
| JP | 11-331436 | 11/1999 |
| JP | 2005-094127 | 4/2005 |
| JP | 2005-151478 | 6/2005 |
| JP | 2005-311781 | 11/2005 |
| JP | 2006-311159 | 11/2006 |
| JP | 2007-184672 | 7/2007 |

* cited by examiner

Primary Examiner — Nasser Goodarzi
Assistant Examiner — Fred Peng
(74) Attorney, Agent, or Firm — Antonelli, Terry, Stout & Kraus, LLP.

(57) ABSTRACT

In IP telephony systems, it has become impossible to detect the location of installation of a telephone terminal from the telephone number, since an IP telephone terminal can be installed in an arbitrary location. Also, even if one observes the calling party number presentation at the time of an incoming call, it has become impossible to grasp from where the calling party is placing the outgoing call. It is possible that, within an IP telephony system, a terminal location detection means is configured and the installation location of a telephone terminal is detected simultaneously with the registration of the telephone terminal. In addition, the problem can be solved by configuring, in an IP telephony server, a device of reporting location information about the correspondent to the telephone terminal and by configuring, in the telephone terminal, a device of displaying the received positional information.

13 Claims, 14 Drawing Sheets

| | 401 | 402 | | 403 |
|---|---|---|---|---|
| | INTERNAL LINE NUMBER | IP ADDRESS | --- | LOCATION ID |
| | 3001 | 10.0.1.1 | --- | OSAKA A2 |
| | ⋮ | ⋮ | ⋮ | ⋮ |
| | 4001 | 10.0.2.1 | --- | TOKYO B1 |
| | ⋮ | ⋮ | ⋮ | ⋮ |

103

TELEPHONY SYSTEM

BACKGROUND OF THE INVENTION

The present invention pertains to an IP telephony system displaying the locations of telephone terminals.

Since conventional telephony systems are connection schemes based on independent telephone lines, it has not been possible to readily move and modify a telephone terminal or a telephone number. However, in IP telephony systems, whose spread has been observed in recent years, a point has been reached, since they are connection schemes passing through an IP network, where IP telephone terminals can function as telephones anywhere if they are connected to an IP network. In this way, it has become possible, in an IP telephony system, to freely move an IP telephone terminal without any restrictions in particular on the location of connection of the IP telephone terminal.

A general IP telephony system is composed of an IP telephony server, each of the IP telephone terminals, and a network connecting these. The IP telephony server is composed of a telephone terminal management table administering telephone numbers corresponding to the IP addresses of telephone terminals under control; a terminal registration part registering, in the telephone terminal management table, the telephone numbers corresponding to the IP addresses of the telephone terminals under control; and a call connection part connecting, with respect to an outgoing telephone call request from a terminal, the telephone terminal of the other party. Each IP telephone terminal also has a call connection part. In an IP telephony system, it comes about that, by registering the telephone terminal information of each IP telephone terminal as the initial setting in the telephone terminal management table, each of the IP telephone terminals can for the first time carry out outgoing and incoming telephone calls.

As a call connection specification that is utilized in as standardized way in IP telephony systems, there is the Session Initiation Protocol (below abbreviated as SIP). In SIP, basic sequences of a terminal registration method and a call connection method are standardized. In an IP telephony system, taking the opportunity of the time of connection with the network and the time at which power is turned on, the IP telephone terminal sends a REGISTER command, which is a terminal registration request command including the telephone number and the IP address of the IP telephone terminal, to the IP telephony server. The IP telephony server having received this registers IP telephone terminal attribute information, such as the extension number and the IP address of the IP telephone terminal, in the telephone terminal management table by means of the terminal registration part. The IP telephony server returns "200 OK" as the processing result if what is concerned is a regular termination. In the aforementioned series of processes, the IP telephone terminal is registered in the IP telephony server and is devised to be able to function as a telephone terminal.

Next, there will be described the process in the case where an outgoing telephone call is placed from the IP telephone terminal on the outgoing call side to the IP telephone terminal on the incoming call side. This call connection process is one that is executed between the call connection parts of the IP telephone terminal on the outgoing call side and the IP telephone terminal on the incoming call side, and the call connection part of the IP telephony server.

First, the telephone terminal on the outgoing call side sends an INVITE command, which is a call connection request command, to the IP telephony server. The IP telephony server having received this deduces the IP address, corresponding to the extension number of the telephone terminal on the incoming call side, from the telephone terminal management table and sends an INVITE command destined for the same IP address. Also, the IP telephony server sends a TRYING command, which is a command during processing, to the telephone terminal on the outgoing call side. The telephone terminal on the incoming call side returns a TRYING command with respect to the connection request from the IP telephony server. Next, the telephone terminal on the incoming call side sends, together with sounding a ring back tone, a RINGING command, which is a command during paging, to the IP telephony server. If the IP telephony server receives this, it sends a RINGING command to the telephone terminal on the outgoing call side. If a receiver at the telephone terminal on the incoming call side is picked up, or the like, to reply to the paging, the telephone terminal on the incoming call side sends the "200 OK" command, which is a command to the effect that connection is possible, sent by the telephone terminal on the incoming call side to the IP telephony server. If the IP telephony server receives this, it sends a "200 OK" command, which is a command to the effect that connection is possible, to the telephone terminal on the outgoing call side.

If the telephone terminal on the outgoing call side receives this, it sends an ACK command, which is a connection call completion command, to the IP telephony server and starts the input and output of voice data. The IP telephony server receives this, and sends an ACK command to the telephone terminal on the incoming call side. The telephone terminal on the incoming call side receives this, completes connection control, and starts input and output of the voice data. By means of the aforementioned series of call connection processes, telephone communication is launched between the telephone terminal on the outgoing call side and the telephone terminal on the incoming call side.

In this way, the IP telephone terminal has the characteristic, by registering its own IP address in the IP telephony server after connecting with the IP network, of being able to function as a telephone terminal no matter where it is connected with the IP network. Also, SIP is the standard specification, but there is an extension field in the transmitted and received commands and by utilizing this field, individual data transfers between a telephone terminal and the IP telephony server, or between the telephone terminals themselves, are made possible without modifying the basic call connection sequence.

In free address offices, which have become popular in recent years, what is concerned is an office environment where business operations are possible by connecting one's own Personal Computer (below abbreviated as PC) wherever one is sitting inside the company. In an office environment such as this, best use is made of the characteristics of the aforementioned IP telephony system, so if the IP telephone set having one's own extension number is connected with the IP network at the seat where one has sat down, it becomes possible, by having the IP telephone set carry out registration processing in the IP telephony server, to utilize the set as one's own extension telephone set at the same seat. Regarding the IP address, it is possible for the IP telephone set to acquire it automatically after connection with the IP network by utilizing DHCP (Dynamic Host Configuration Protocol). Also, as an IP telephone terminal oriented toward this free address office, a softphone functioning on a notebook type PC that is comparatively easily portable is appropriate. The utilization of thin clients preventing leakage of information during transport outside the company is spreading and there are also being developed softphones that can also be utilized with a thin client. In an IP telephony system, the effect of being able to "carry along" this number, one's own extension telephone number, is significant, making it possible to place and receive telephone calls with one's own extension number at any base that is connected with the company internal IP network e.g. in the case, during a business trip or the like, of moving to a base office and connecting with the company internal IP network, or the like.

Moreover, since the positions of getting seated are free in this free address office, there is the problem that it becomes impossible to know the seating positions. With respect to this problem, there is proposed, e.g. in JP-A-2005-94127, a method of detecting the seating state used by the telephone terminal. JP-A-2005-94127 is one procedure for detecting the location utilized by the telephone terminal, there being proposed to use the fact that the telephone terminal and the PC are connected as a pair and the PC having a mechanism of alerting the server about the existence of a telephone terminal connected with it. In other words, a PC for transmitting positional information the server becomes necessary, there being the problem that the telephone terminal considered in isolation is unable to detect the same location.

SUMMARY OF THE INVENTION

As stated above, in IP telephony systems, it has become impossible to detect the location of installation from the telephone number as was conventionally the case, since the installation locations of IP telephone terminals are free. Even if it would be possible, there has been the need to carry out special processing on the terminal side, in the location where the IP telephone terminal is utilized, with a PC or the like communicating positional information to the server. In this case, there has been a need to bring to the terminal side a special function for transmitting positional information, in addition to a server collecting terminal location information. Because of that, there has arisen an increase in the financial cost and a need to bring the same function between all the terminals, so there has been a problem from the aspect of expansion.

Also, even if observing the calling party number presentation at the time of receiving the telephone call, it has been inconvenient not to be able to grasp from where the calling party was placing the call. Also, it has been inconvenient not to be able to grasp the situation of the floor of the calling party and not to be able to carry on a conversation while feeling at ease.

In order to resolve the aforementioned problems, there is, in the present invention, characterized the fact of bringing a function of detecting the location of a terminal on the server side of the IP telephony system. As a result hereof, the need to bring to the terminal side a special function for communicating positional information to the server is eliminated and if what is concerned is an IP telephone capable of connection with the IP network, acquisition of positional information becomes possible, independently of the manufacturer or the type. Also, in the IP telephony server, there is configured a means of reporting the other party's positional information to a telephone terminal. Moreover, the system is characterized by providing, in the telephone terminal, a means of displaying received positional information. In addition, in case the telephone terminal is a softphone on a PC on which other programs can operate, the system is characterized by providing a means of cooperation with a floor plan display system in the softphone.

According to the present invention, it is possible to correctly grasp the current telephone terminal installation location without installing special equipment for local presentation. In particular, even in the case of a mobile type telephone terminal such as a softphone or a portable terminal, it is possible to grasp the current location. Also, at the time of placing the telephone call, it is possible to display, on the telephone terminals of the calling party and the called party, the installation location of the other party's telephone terminal. As a result hereof, it is possible to understand from where the other party is placing the call and to carry on the conversation while feeling at ease. Even in the case of making a telephone call in a softphone from a PC or a thin client in a free address office, the system is devised so that the seating position is displayed correctly to the other part. Further, in the case of receiving a call to a softphone on a PC, it is possible to display a plan of the floor on which the calling party telephone terminal is installed, together with receiving the call, the result being that it is possible to check the surrounding environment of the calling party and the existence of seated persons in the surroundings and to carry on a conversation while feeling at ease.

DESCRIPTION OF THE EMBODIMENTS

Hereinafter, the embodiments of the present invention will be described with reference to the drawings.

1. The First Embodiment

Figure 1:
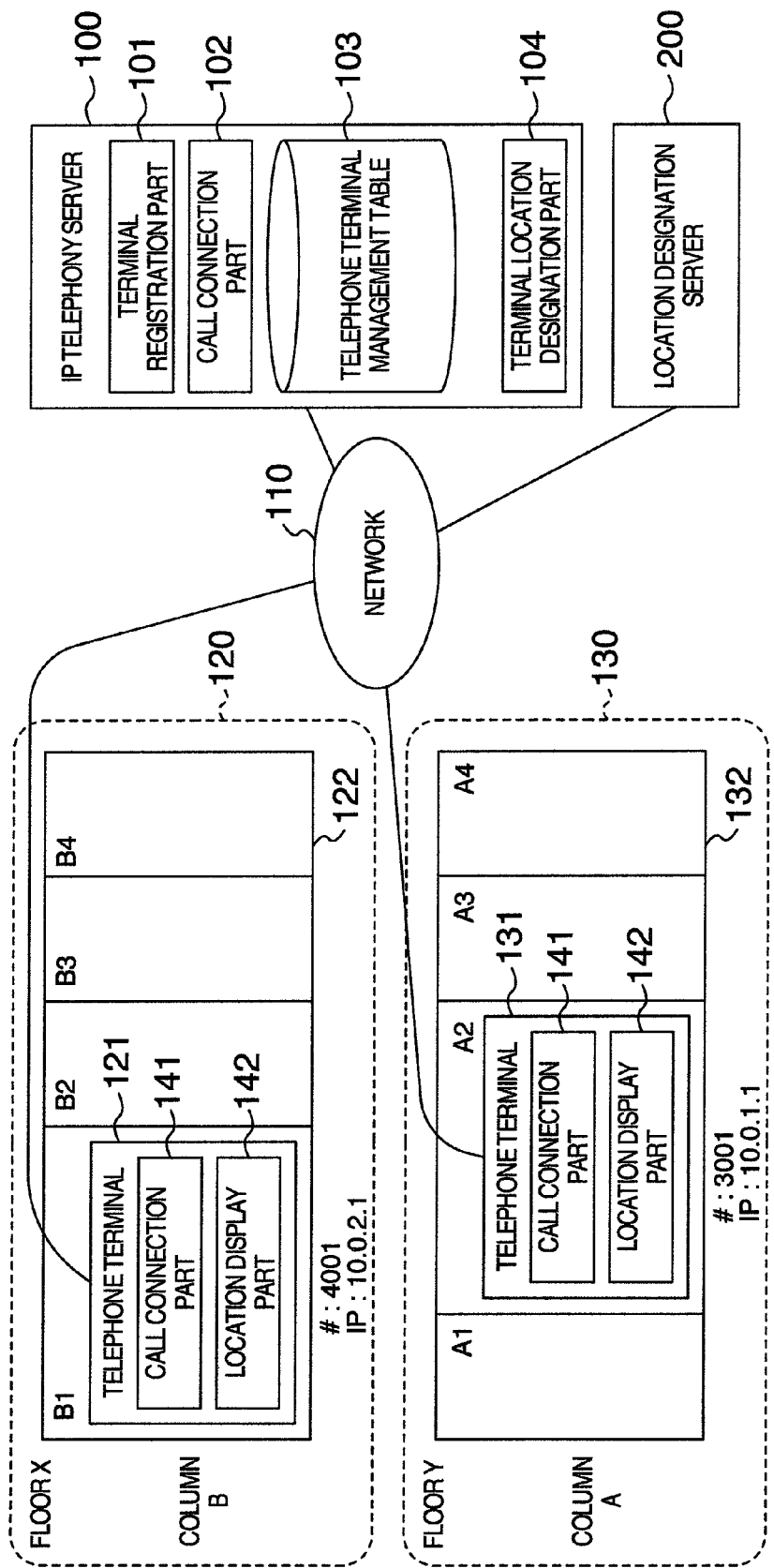
FIG. 1 is an example of an IP telephony system block diagram showing an embodiment of the present invention.

FIG. 1 is a system block diagram showing an embodiment of an IP telephony system of the present invention. That is to say that it is composed of an IP telephony server 100 being a company Private Branch exchange PBX, respective IP telephone terminals 121 and 131 connected with a floor of a base such as a building in which an office is housed, a location detection server 200 detecting IP equipment locations, and an IP network 110 connecting these. Each of IP telephone terminals 121 and 131 is taken to be connected with IP telephony server 100 via a relay device such as a switch or a router. Of course, it is also possible for them to be directly connected without passing through a relay device. In the present embodiment, telephone terminal 121 is present at B1 on a desk 122 within Floor X 120. Similarly, telephone terminal 131 is present at A2 on a desk 132 inside Floor Y 130.

Figure 15:
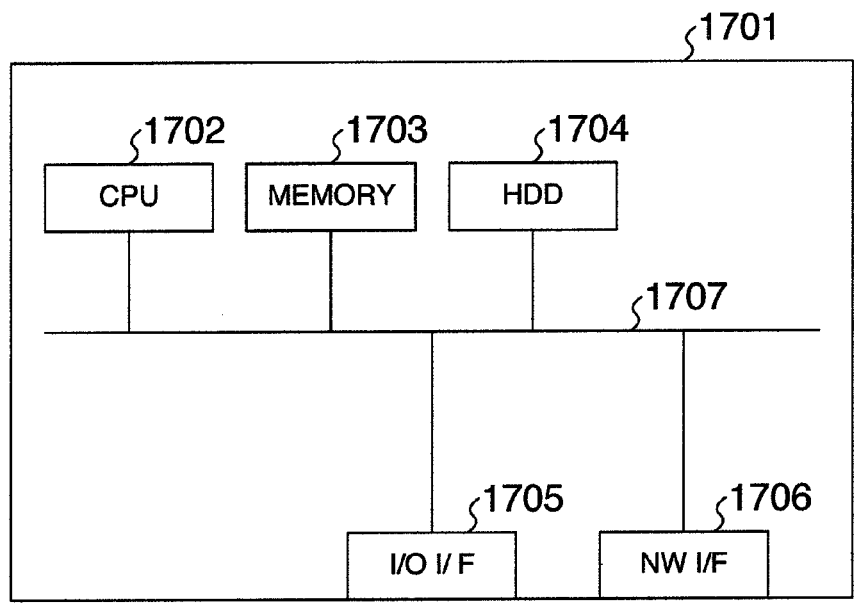
FIG. 15 is an example of a hardware configuration of an IP telephony server and a location detection server.

The hardware of IP telephony server 100 and location detection server 200 may be normal information processing devices, an example of a block diagram thereof being shown in FIG. 15. In FIG. 15, an information processing device 1701 has a configuration in which a CPU (Central Processing Unit) 1702, a memory 1703, a hard disk drive 1704, an I/O interface 1705, and a network interface 1706 are connected with a communication bus 1707.

Figure 16:
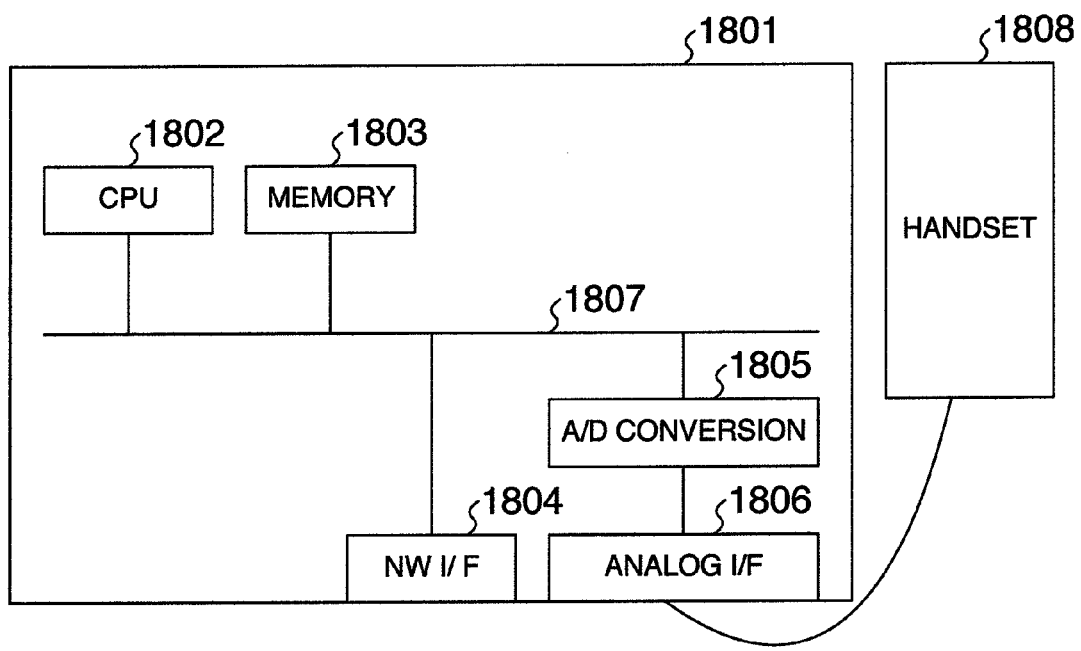
FIG. 16 is an example of an IP telephone terminal hardware configuration.

The hardware of each of IP telephone terminals 121 and 131 may be normal IP telephone devices, an example of a block diagram thereof being shown in FIG. 16. Generally, an IP telephone device has a configuration in which a device body 1801 is connected with a handset 1808 consisting of a microphone/speaker. Device body 1801 is composed of a CPU 1802, a memory 1803, a network interface 1804, and an analog/digital conversion part 1805 which are connected with communication bus 1807 and, further, of an analog interface 1806 linked with analog/digital conversion part 1805. The functions shown in FIG. 1 are e.g. mounted as programs and, in IP telephony server 100 and location detection server 200, the programs of each function are read from memory 1703 and are executed by means of CPU 1702. In IP telephone device 1801, similarly, the programs implementing each function are read from memory 1803 and are executed by means of CPU 1802.

IP telephony server 100 has a telephone terminal management table 103 saving IP addresses of IP telephone terminals 121 and 131, telephone numbers, positional information, and the like; a terminal registration part 101 registering the IP addresses and telephone numbers of IP telephone terminals 121 and 131 in telephone terminal management table 103; a call connection part 102 carrying out telephone call connections; and a terminal location detection part 104, which is a characteristic of the present embodiment, detecting the installation location of a piece of IP equipment. Terminal location detection part 104 is one that detects, from the IP address of a piece of IP equipment, the location where the same piece of IP equipment is installed. In practice, terminal location detection part 104 pages location detection server 200 and, from the IP address, carries out a detection of the location where the same piece of equipment is installed. Further, in the present embodiment, there is chosen a configuration in which the function of detecting the location of installation of a piece of IP equipment is mounted in location detection server 200, but a configuration in which this function is mounted in the same casing as IP telephony server 100 may also be chosen.

Telephone terminals 121 and 131 respectively have a call connection part 141 for carrying out call connection processing and a location display part 142 displaying positional information about the telephone terminal of the telephone conversation partner.

Figure 2:
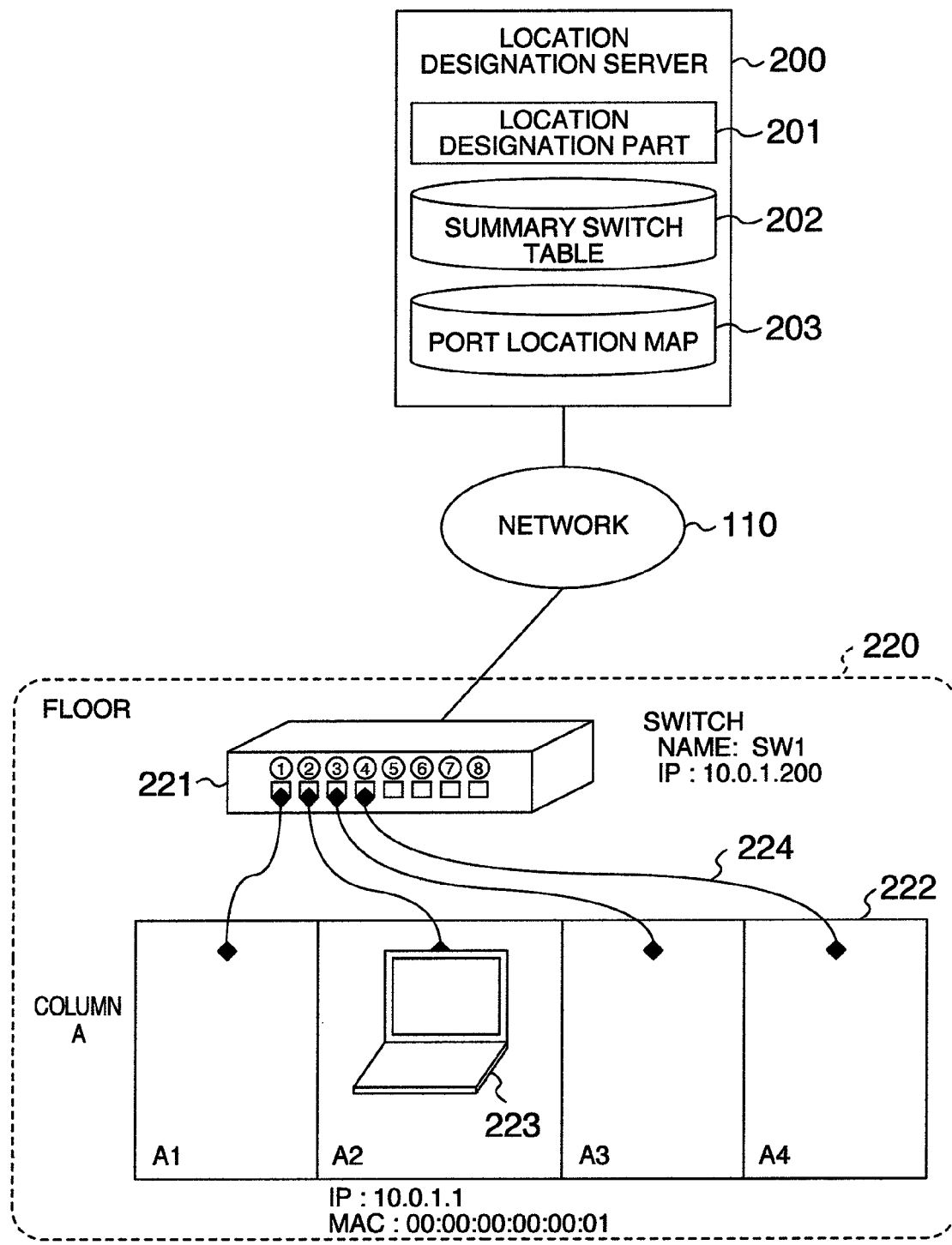
FIG. 2 is an example of a block diagram explaining a location detection scheme.

First, there will be given a detailed explanation regarding an IP equipment location detection method related with a characteristic of the present embodiment. This is a method which, from the IP address of the piece of IP equipment desired to be looked up, detects the location of installation of the same piece of IP equipment. FIG. 2 is a block diagram explaining this method and is composed of location detection server 200, a network switch 221 (below abbreviated as "switch"), a network 110 connecting these, and a piece of IP equipment 223 connected with switch 221. Location detection server 200 has a summary switch table 202 and a port location map 203, and a location detection part 201 which, utilizing the data of these, can detect the location of a piece of IP equipment from an IP address.

Figure 6:
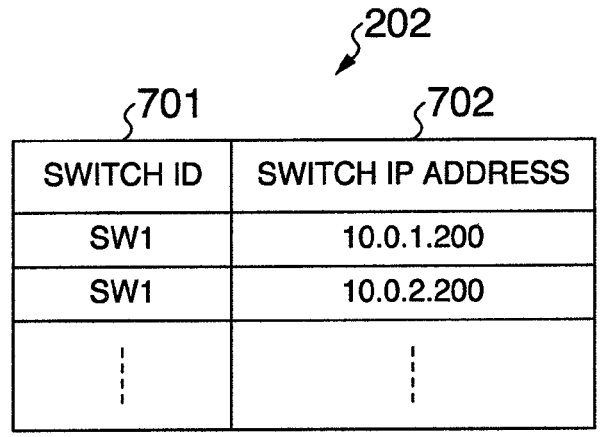
FIG. 6 is an example of a summary switch table.
Figure 7:
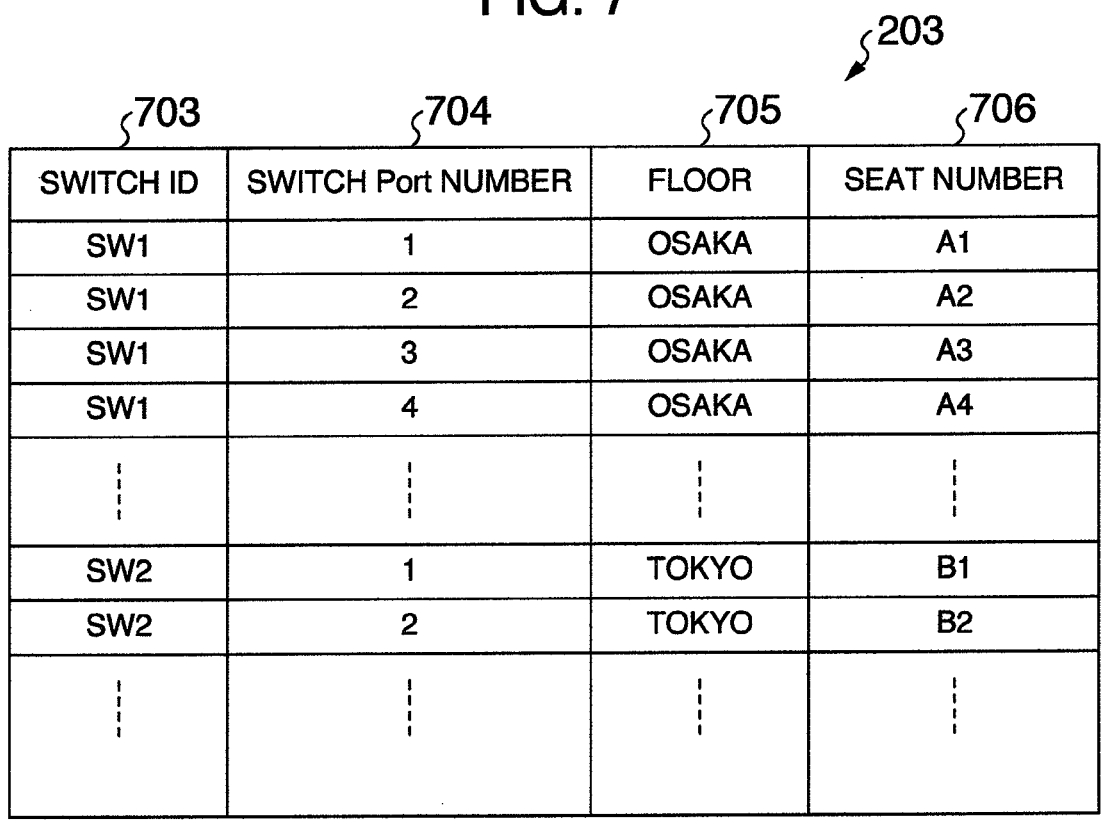
FIG. 7 is an example of a port location map.

Summary switch table 202 includes, as shown in FIG. 6, switch IDs 701 and switch IP addresses 702. Port location map 203 includes, as shown in FIG. 7, switch IDs 703, switch port numbers 704, floors 705, and seating numbers 706. The defined information of summary switch table 202 and port location map 203 is information that can, in either case, be data registered at the time of constructing the company network. Also, in the present example, the information is divided into two data tables, but the information may also be defined in one table.

Switch 221 is of an intelligent type provided with an external interface capable of information transfer to and from an external computer. As the external interface of switch 221, the Simple Network Management Protocol (below abbreviated as SNMP) is utilized widely even generally. The external computer, utilizing SNMP, can acquire IP address and MAC address information about piece of IP terminal or equipment 223 controlled inside the switch. Piece of IP equipment 223 is a piece of equipment that operates by being connected with an IP network like with PCs and IP telephone sets. In the configuration of FIG. 2, in order to explain in concrete terms the processing method of detecting the location of installation of piece of IP equipment 223, "SW1" is allocated for the switch ID of switch 221 and "10.0.1.200" for the switch IP address, floor 220 is taken to be "Osaka" and seating number "A1" to seating number "A4" are allocated to desk 222 inside floor 220, and a LAN cable 224 appearing at "A1" to "A4" is taken to be wired to switch ports #1 to #4 of switch 221. If these pieces of installation information are stored in respectively summary switch table 202 and port location map 203, the result is as shown in FIG. 6 and FIG. 7.

Here, piece of IP equipment 223 having the IP address "10.0.1.1" and the MAC address "00: 00: 00: 00: 00: 01" is taken to be that installed at seat "A2" and connected with LAN cable 224.

Figure 3:
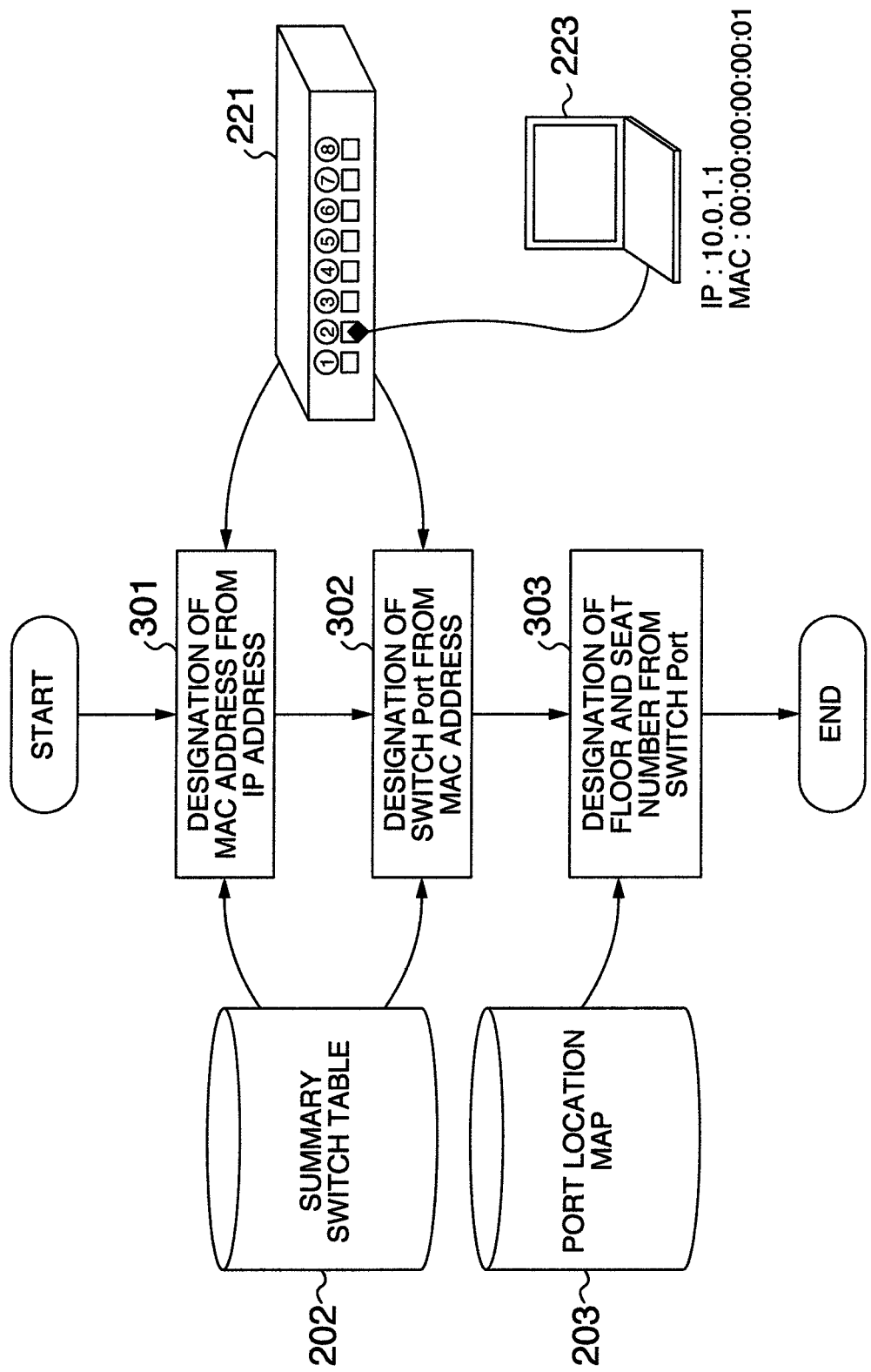
FIG. 3 is an example of a process flow explaining the location detection scheme.

In FIG. 3, the process flow of location detection part 201 is shown. First, location detection part 201 detects a MAC address from the search object IP address (Process 301). For the MAC address detection, the result thereof is determined by issuing MAC address search commands in regular order with respect to each of the switches registered in summary switch table 202. As for the MAC address search command, if e.g. SNMP is used, it becomes "snmpget (IP address of the switch) 1.3.6.1.2.1.4.22.1.2.1. (search object IP address)". The command "snmpget" is an information acquisition command with respect to an SMTP-compatible piece of equipment. As the first argument, the IP address of the switch requesting information acquisition is detected. As the second argument, parameters specifying the information to be acquired are detected. In the present embodiment, in case information is requested of switch 221, it becomes like "snmpget 10.0.1.200 1.3.6.1.2.1.4.22.1.2.1.10.0.1.1". Among the second parameters of the command, the ending four-digit numeral "10.0.1.1" is the search object IP address. Switch 221 returns a corresponding MAC address with respect to this command, if a piece of equipment having a MAC address corresponding to the search object IP address is connected. The SNMP result is e.g. returned as "1.3.6.1.2.1.4.22.1.2.1. (search object IP address)=(MAC address)". In the present example, as the result of a search of the switch ID "SW1" by location detection part 201, the MAC address "00: 00: 00: 00: 00: 01" corresponding to the IP address "10.0.1.1" is returned as "1.3.6.1.2.1.4.22.1.2.1.10.0.1.1=00: 00: 00: 00: 00: 01" from SW1 to location detection part 221.

Next, location detection part 201 detects a port number from the MAC address (Process 302). For the port number detection, the result thereof is determined by issuing port search commands in regular order with respect to each of the switches registered in summary switch table 202. The port search command becomes, if e.g. SNMP is used, "snmpget (switch IP address) 1.3.6.1.2.17.4.3.1.2. (search MAC address)". In the present embodiment, in case information is requested of switch 221, it becomes like "snmpget 10.0.1.200 1.3.6.1.2.1.17.4.3.1.2.00.00.00.00.00.01". With respect to this command, switch 221 returns the port number of the switch with which the terminal thereof is connected, in case the search object MAC address is connected. E.g., the SNMP result is returned as "1.3.6.1.2.1.17.4.3.1.2. (search MAC address)=(port number)". In the present example, it is returned as "1.3.6.1.2.1.17.4.3.1.2.00.00.00.00.00.01=2", "2" being the port number of the switch with which the piece of equipment having the switch ID "SW1" and the MAC address "00: 00: 00: 00: 00: 01" is connected.

Subsequently, location detection part 201 detects the location of installation from the switch ID and the switch port number (Process 303). In order to perform the detection of the location of installation, location detection part 201 extracts the floor and seat number corresponding to the switch ID and the switch port number obtained in Process 302 by searching, in regular order, the data records of port location map 203. In the present example, based on the switch "SW1" and the port number "2", it searches port location map 203 and obtains that the floor is "Osaka" and the seat number is "A2".

By means of the aforementioned series of processes, in location detection part 201, it is possible to detect the location of installation of piece of IP equipment 223 from the given IP address. Moreover, in the present series of processes, it is also possible to omit Process 301 in case the MAC address is known in advance.

The processing scheme shown in FIG. 3 is a scheme of detecting, one after another, the connection locations of piece of IP equipment 223 and e.g., even if the connection location of piece of IP equipment 223 has changed, it has the characteristic of being able to detect the normally correct installation location. E.g., in FIG. 2, in case piece of IP equipment 223, which is installed at "A2", is relocated and connected to "A4", it is possible, by detecting port number "4" in Process 302 of FIG. 3, to correctly obtain the floor "Osaka" and the seat number "A4" in subsequent Process 303. In this way, the aforementioned proposed scheme, even in the case where the connection state of piece of IP equipment 223 sometimes changes every moment, has the characteristic of being able to correctly acquire the location of connection at that time.

Figures 4, 5:
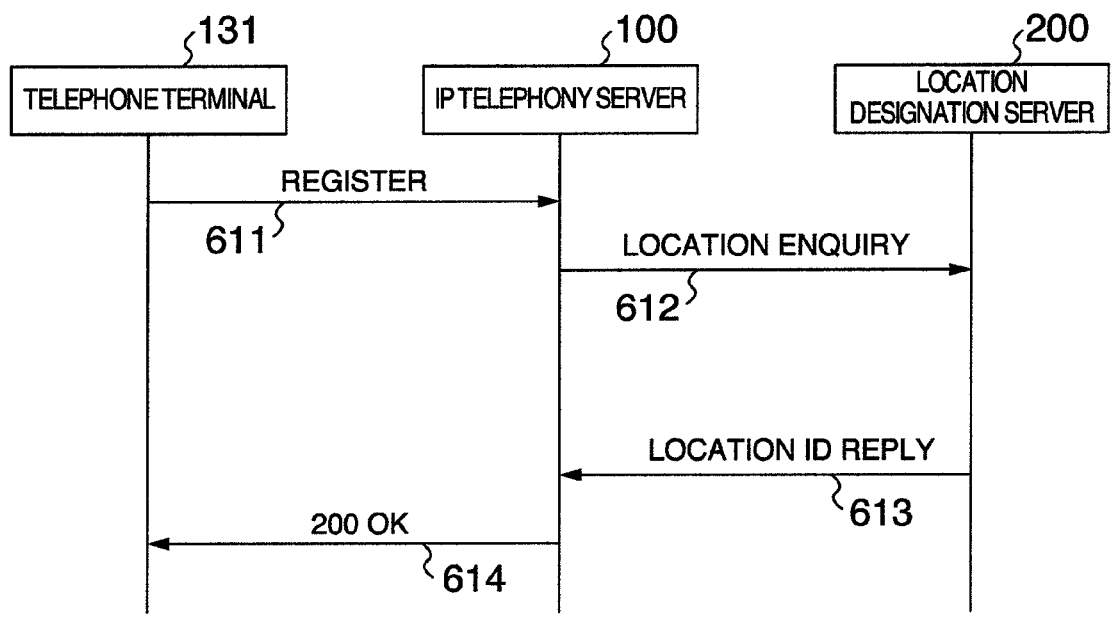
FIG. 4 is an example of a telephone terminal management table.
FIG. 5 is an example of a terminal registration process sequence showing an embodiment of the present invention.

In FIG. 1, telephone terminal management table 103 within IP telephony server 100 is a table registering IP telephone terminals in order to perform a telephone exchange function associated with the IP telephony system. Telephone terminal management table 103 is, as shown in FIG. 4, managed including information such as extension numbers 401 and IP addresses 402 allocated to telephone terminals. In the present embodiment, it is a characteristic that there is provided an area in which it is possible to store telephone terminal installation locations in this telephone terminal management table 103, as shown in location ID 403 of FIG. 4.

Next, an explanation will be given regarding the processing scheme whereby the location of a telephone terminal is detected simultaneously with the telephone terminal registration. Terminal location detection part 104 is a part that detects, on the basis of the IP address of a telephone terminal registered in terminal registration part 101, the location of the telephone terminal, and registers this location information in telephone terminal management table 103. The series of sequences, from the registration of the telephone terminal up to the detection of the location of the registered telephone terminal is shown in FIG. 5. IP telephony server 100 carries out, when a REGISTER command is received from telephone terminal 131 (Process 611), an enquiry about the location of telephone terminal 131 to location detection server 200 (Process 612). Location detection server 200 returns the location ID of the looked up telephone terminal 131 to IP telephony server 100 (Process 613). At the very end, IP telephony server 100 returns "200 OK" with respect to telephone terminal 131 (Process 614).

Figure 13:
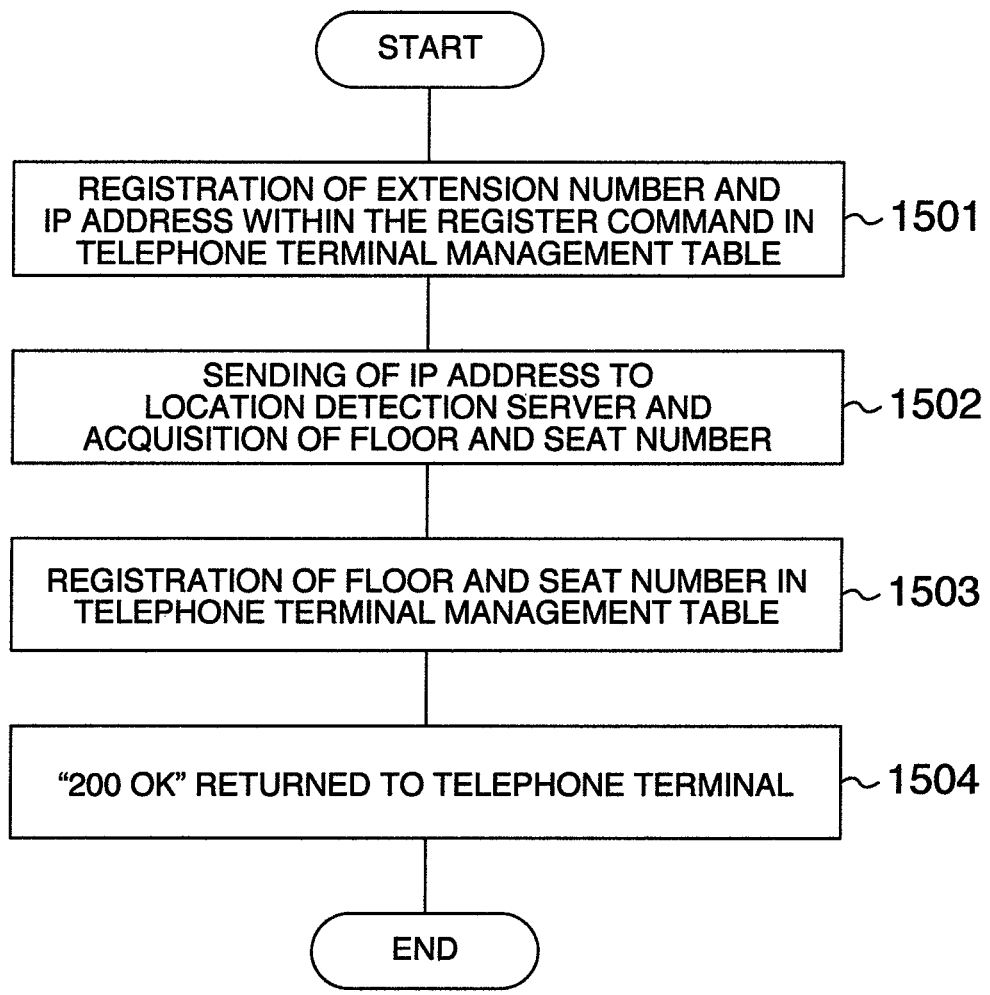
FIG. 13 is an example of an IP telephony server process flow executed if a REGISTER command is received from an IP telephone terminal.

The process flow of the REGISTER command in FIG. 5 is shown in FIG. 13. The processes shown in FIG. 13 are launched at START when a REGISTER command is received from an IP telephone terminal. First, the extension number and the IP address sent with the REGISTER command are received by call connection part 102. Next, terminal registration part 101 receives the extension number and the IP address from call connection part 102 and registers the same in telephone terminal management table 103 (Process 1501). E.g., in case IP telephone terminal 131 having the extension number "3001" and the IP address "10.0.1.1" reports the REGISTER command to the IP telephony server, the data are stored by means of Process 1501, as shown in FIG. 4.

Subsequently, terminal location detection part 104 receives the IP address sent with the REGISTER command from call connection part 102, sends the received IP address of the IP telephone terminal to location detection server 200 and requests a detection of the location of the IP telephone terminal, and location detection server 200, having received the request, returns the floor and the seat number (Process 1502). E.g., in case IP telephone terminal 131 is installed on Floor "Osaka" and Seat "A2" and the IP address thereof is "10.0.1.1", it is obtained by means of the aforementioned processes of FIG. 3, that the floor is "Osaka" and the seat number is "A2".

Next, the floor and seat number obtained with Process 1502 are registered in telephone terminal management table 103 (Process 1503). E.g., in case it is obtained in Process 1502 that the floor is "Osaka" and the seat number is "A2", the data item "Osaka A2" is stored in location ID 403 by means of Process 1503, as shown in FIG. 4. At the very end, "200 OK" is returned to IP telephone terminal 131 (Process 1504). That being all, REGISTER processing comes to an end and IP telephony server 100 returns to a state of waiting for the subsequent command. Also, in case Floor 2 is Floor "Tokyo" and IP telephone terminal 121 having the extension number "4001" and the IP address "10.0.2.1" is connected at Seat "B1" of Floor 2, there is set, by executing the same aforementioned REGISTER processes, the telephone terminal information that the extension number is "4001", as shown in FIG. 4.

In the aforementioned series of processes, the result is that, simultaneously with the registration of the IP telephone terminal inside IP telephony server 100, the location of installation of the same terminal is also registered. If IP telephone terminal 131 is disconnected from network 110 and once again connected with network 110 at a separate location, since there is sent a REGISTER command, which is a terminal registration process request to IP telephony server 100, it comes about that location ID 403 of telephone terminal management table 103 is updated with the same location as the new location of installation, by means of the processes of FIG. 5 and FIG. 13. In particular, even with a softphone or a portable terminal, it is connected with the network at the new location of installation and since there can be an update with the same location of installation with the timing of transmitting the REGISTER command, i.e. the timing of registering in IP telephony server 100, it normally becomes possible to save the most recent connection location.

Also, terminal location detection part 104 may be a location resolution means other than that of the present scheme, a means capable of detecting, from an extension number or an IP address, the location of the terminal thereof being acceptable. E.g., there is also the scheme of detecting, with the installation location or the like of a base station with which an on-site PHS (Personal Handyphone System) is accommodated, the location of a PHS terminal, the information in this case becoming on which storey of the base floors the correspondent is or the like.

Further, according to the present invention, since a telephone terminal connection state that sometimes changes by the moment is also grasped, it becomes possible for the user or the administrator, by consulting telephone terminal management table 103 as the need arises, to learn where the same terminal is connected with the aid of the extension number.

2. The Second Embodiment

Subsequently, Embodiment 2 of the IP telephony system will be shown. Specifically, it is an embodiment for which, at the time of placing an outgoing call, it is made possible to display the location of the telephone terminal on the incoming call side to the telephone terminal on the outgoing call side and, together with the incoming call, display the location of the telephone terminal on the outgoing call side to the telephone terminal on the incoming call side.

The present embodiment can, as shown in FIG. 1, be implemented by transferring location data between call connection part 102 of IP telephony server 100 and call connection parts 141 of IP telephone terminals 121 and 131 and in the end displaying, with display means 142 of IP telephone terminals 121 and 131, location information about the other party.

As an explanation of the present embodiment, e.g., it is chosen that, when the terminal registration process described in Embodiment 1 comes to completion, data of a telephone terminal such as shown in FIG. 4 are stored in telephone terminal management table 103 inside IP telephony server 100. Also, the substance of the processes of the present embodiment will be described in detail using FIG. 8 and FIG. 14 in the case where, with the extension number of telephone terminal 121 on the outgoing call side being "4001" and the extension number of telephone terminal 131 on the incoming call side being "3001", an outgoing call is placed from "4001" to "3001".

Figure 8:
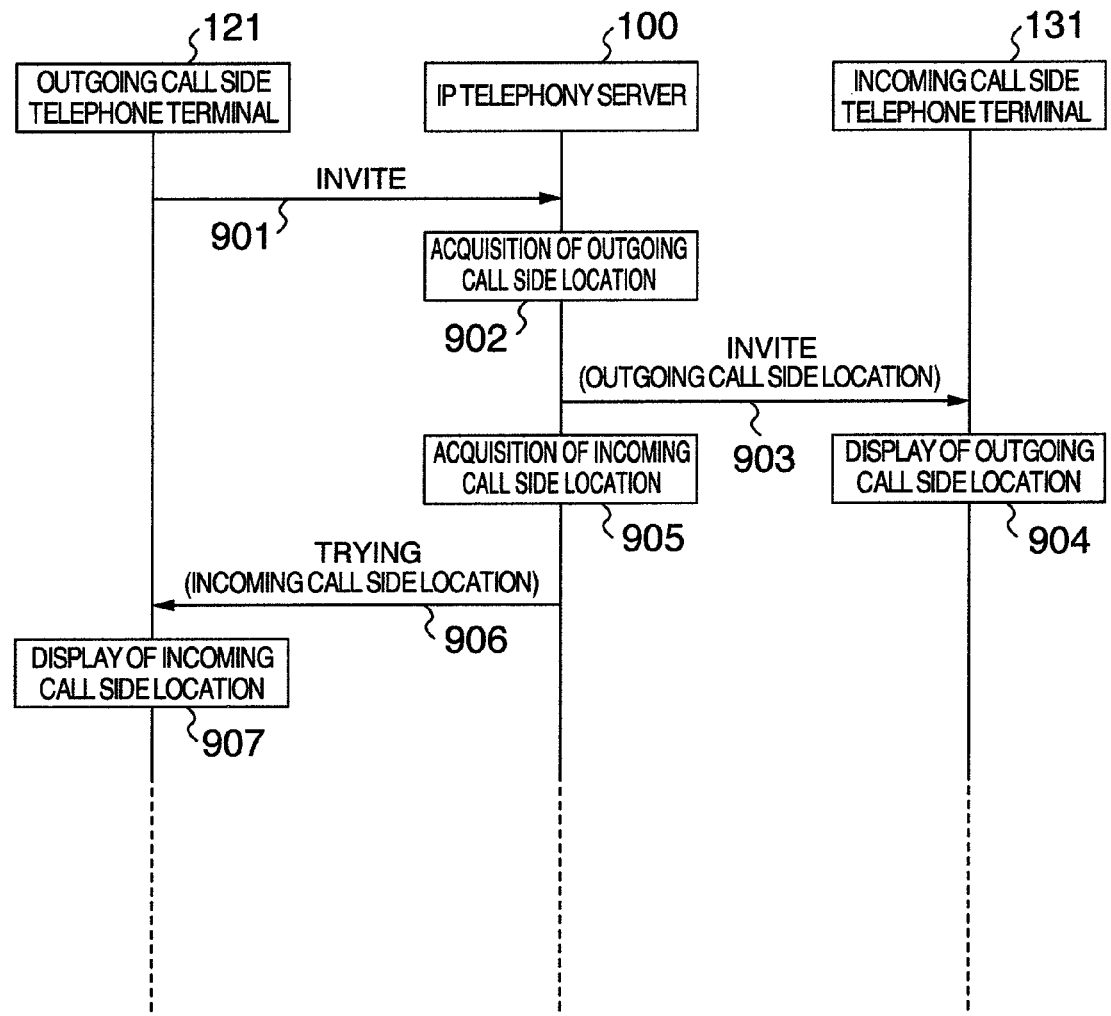
FIG. 8 is an example of a connection control sequence showing an embodiment of the present invention.

FIG. 8 is a call connection sequence in the present embodiment occurring when an outgoing telephone call is placed from telephone terminal 121 on the outgoing call side to telephone terminal 131 on the incoming call side. In the present embodiment, the processing of IP telephony server 100 with respect to an INVITE message is a characteristic. First, IP telephony server 100, if receiving an INVITE command from the telephone terminal on the outgoing call side (Process 901), searches telephone terminal management table 103, acquires positional information about telephone terminal 131 on the outgoing call side (Process 902), and transmits it, by addition to the INVITE command, to telephone terminal 131 on the incoming call side (Process 903). If telephone terminal 131 on the incoming call side receives the INVITE command, it displays the location of telephone terminal 121 on the outgoing call side on a display or the like, on the basis of the positional information, added to the INVITE command, about telephone terminal 121 on the outgoing call side (Process 904). Also, IP telephony server 100, after transmitting the INVITE command to telephone terminal 131 on the incoming call side, searches telephone terminal management table 103, acquires positional information about telephone terminal 131 on the incoming call side (Process 905), and transmits it by addition to a TRYING command, to telephone terminal 121 on the outgoing call side (Process 906). Telephone terminal 121 on the outgoing call side, if receiving the TRYING command, displays the location of telephone terminal 131 on the incoming call side on a display or the like, on the basis of the positional information about telephone terminal 131 on the incoming call side, added to the TRYING command (Process 907). By reporting, to the respective terminals, the location information about the other party, it is made possible to display the location of the other party on the respective terminals.

Figure 14:
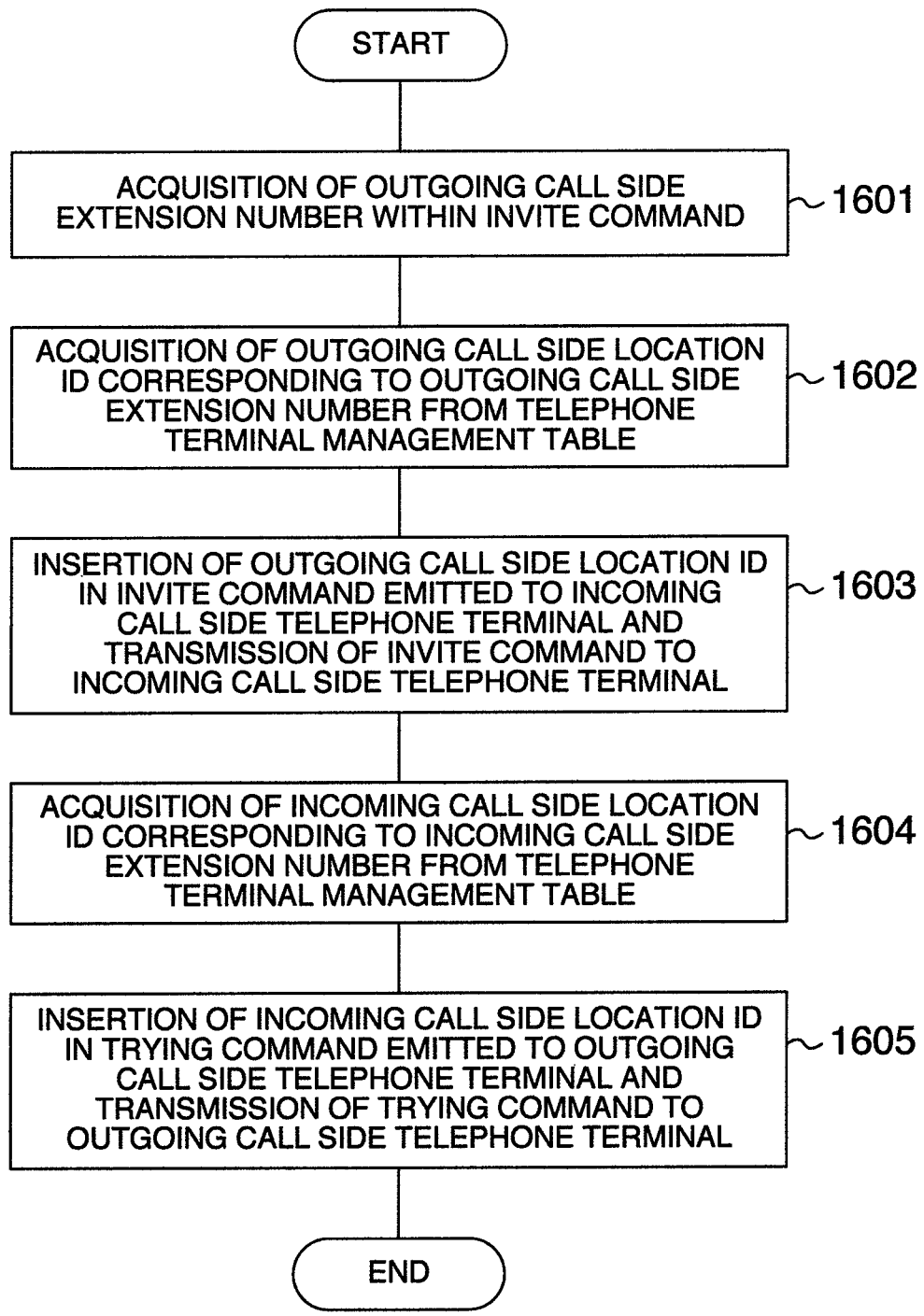
FIG. 14 is an example of an IP telephony server process flow executed if an INVITE command is received from an IP telephone terminal.

FIG. 14 is a process flow of IP telephony server 100 which receives an INVITE command from the telephone terminal on the outgoing call side and in which the command is executed. First, the extension number of the outgoing call side, inside the INVITE command, is acquired (Process 1601). In the present example, "4001" is acquired. Next, the outgoing call side location ID corresponding to the extension number on the outgoing call side is acquired from telephone terminal management table 103 (Process 1602). In the present example, telephone terminal management table 103 is examined on the basis of the acquired extension number "4001" and "Tokyo B1" is acquired as the corresponding location ID. Next, the outgoing call side location ID is inserted in an INVITE command transmitted to the telephone terminal on the incoming call side, and the INVITE command is transmitted to the telephone terminal on the incoming call side (Process 1603). In the present example, the acquired location ID "Tokyo B1" is inserted in the extension field of the INVITE command and transmitted to telephone terminal 131 on the incoming call side.

Next, the incoming call side location ID corresponding to the incoming call side extension number is acquired from telephone terminal management table 103 (Process 1604). In the present example, telephone terminal management table 103 is examined on the basis of the extension number "3001" dialed by the INVITE command and "Osaka A2" is acquired as the corresponding location ID. At the very end, the incoming call side location ID is inserted in a TRYING command transmitted to the telephone terminal on the outgoing call side, and the TRYING command is transmitted to the telephone terminal on the outgoing call side (Process 1605). In the present example, the acquired location ID "Osaka A2" is inserted in the extension field of the TRYING command and transmitted to telephone terminal 121 on the outgoing call side. Location display part 142 of telephone terminal 131 on the incoming call side and telephone terminal 121 on the outgoing call side acquires the location IDs inside the extension fields of the respectively received INVITE command and TRYING command and respectively carries out the screen displays "Location: Tokyo B1" and "Location: Osaka A2".

Figure 9:
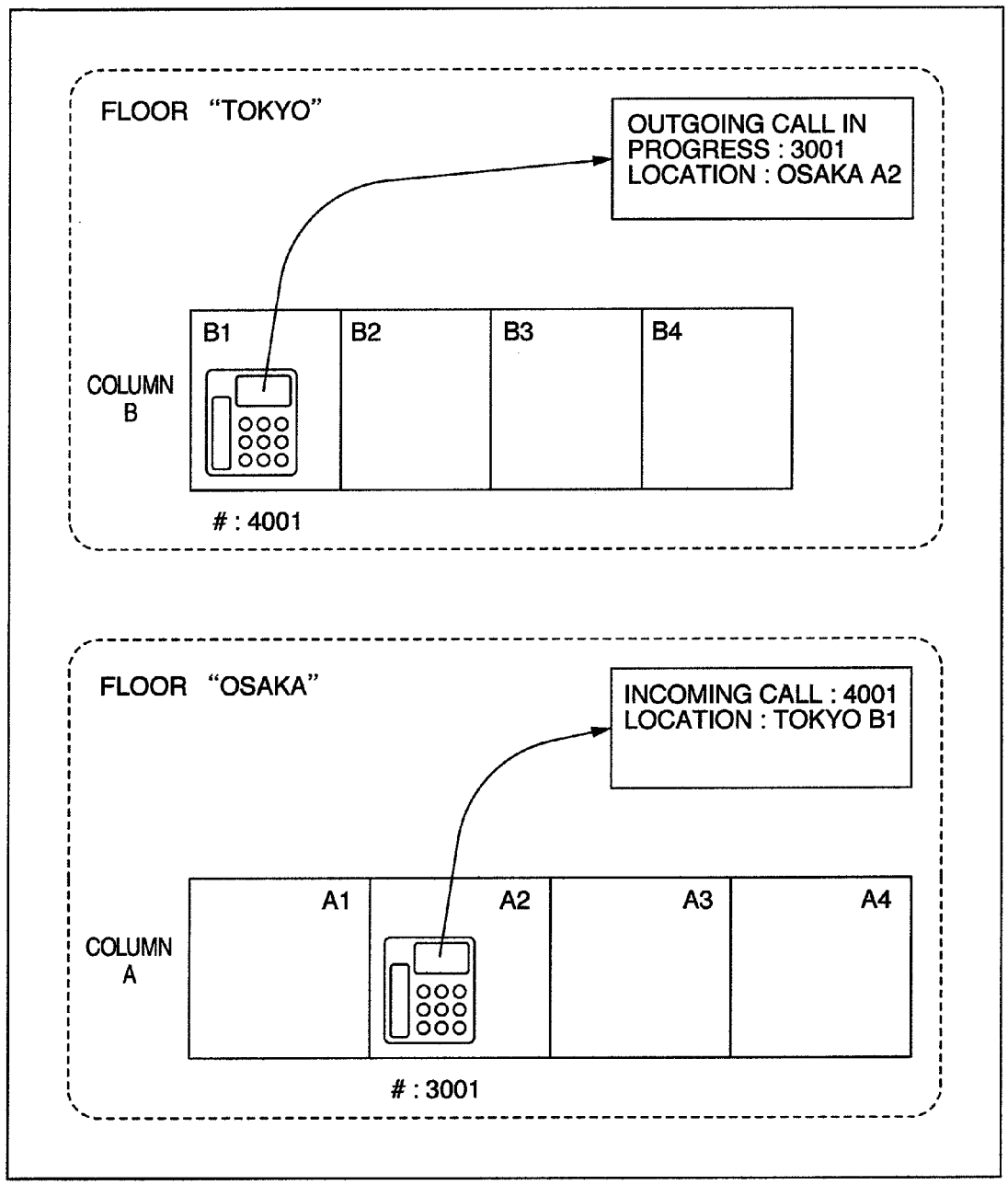
FIG. 9 is an example of a diagram in which a location is displayed on a telephone terminal.

In the aforementioned series of processes, as shown in FIG. 9, it comes about that the location of installation of telephone terminal 131 on the incoming call side is displayed to the calling telephone party as e.g. "Location: Osaka A2" and the location of installation of telephone terminal 121 on the outgoing call side is displayed to the called telephone party as e.g. "Location: Tokyo B1". The present scheme makes possible, without modifying the standard call connection sequence, a display to a telephone terminal of the location of the correspondent telephone terminal.

3. The Third Embodiment

Figure 10:
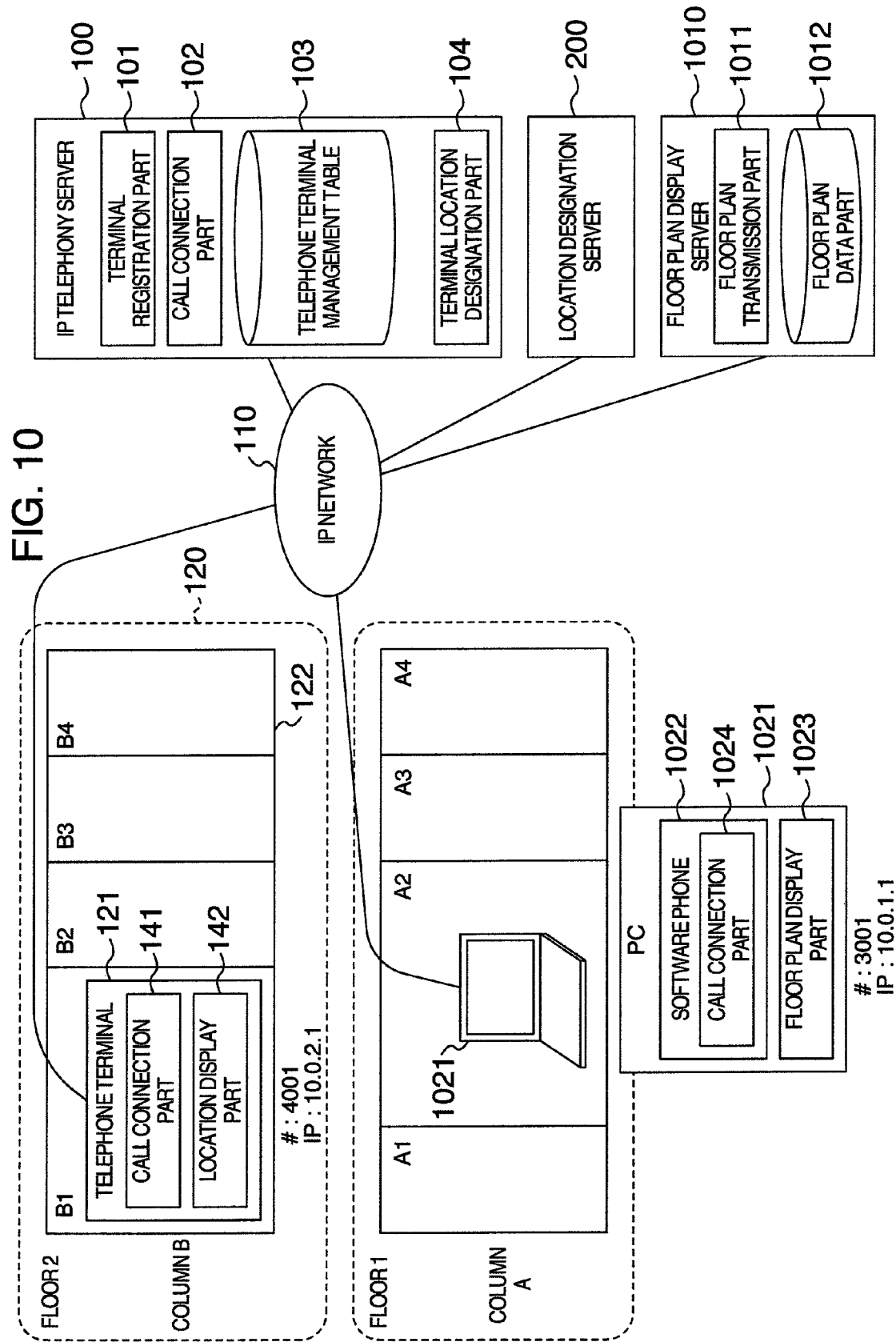
FIG. 10 is an example of an IP telephony system block diagram showing an embodiment of the present invention.

Next, Embodiment 3 of the IP telephony system is shown. FIG. 10 is a block diagram showing an embodiment of the present invention. FIG. 10 shows a configuration in which a floor plan display server 1010 has been added to the configuration of FIG. 1 and connected with IP network 110, and comprising a softphone 1022 having a call connection part 1024 on a PC 1021, as the telephone terminal on the incoming call side, and connected with IP network 110. PC 1021 has a softphone 1022 provided with a call connection part 1024 function and a floor plan display part 1023 which is client software of floor plan display server 1010. The floor plan display system is composed of this floor plan display server 1010 and floor plan display part 1023.

Here, the expression "floor plan" refers to a diagram indicating the floor layout of facilities utilizing telephone terminals, an abstracted model diagram or the like being acceptable. Also, a floor plan is not only for indoors but may also indicate the layout associated with an outdoor range. It is a diagram that is utilized on the occasion of indicating the position of the telephone terminal of a telephone conversation partner. Floor plan display server 1010 has a floor plan data part 1012 and a floor plan transmission part 1011. In floor plan data part 1012, there are stored in advance floor plan data that can be displayed with respect to a location ID. In response to a request from floor plan display part 1023, floor plan transmission part 1011 finds out the concerned floor plan from the floor plan data part and transmits the same floor plan data to floor plan display part 1023.

Figure 11:
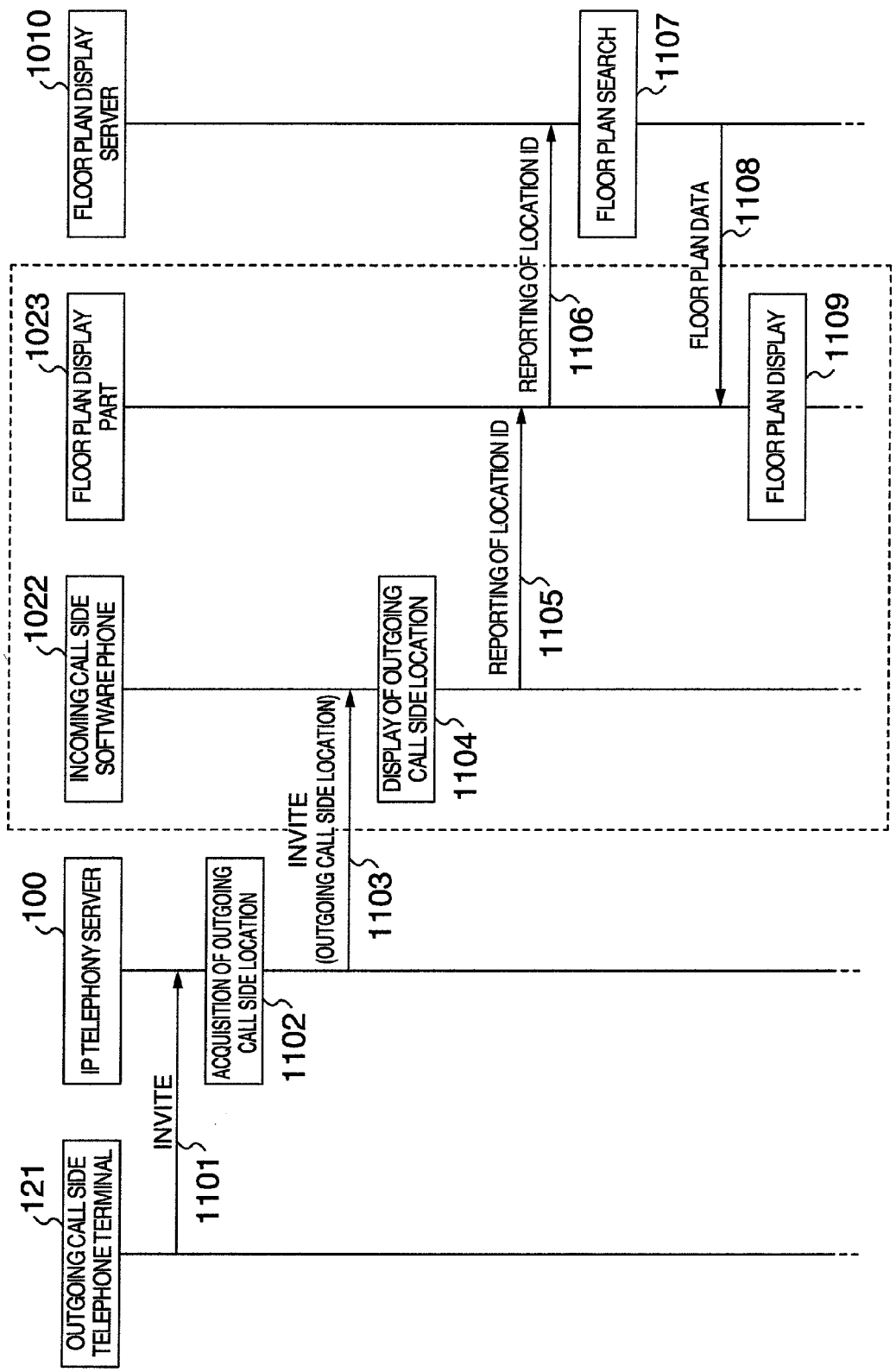
FIG. 11 is an example of a process sequence when a softphone is receiving an incoming call.

The processes in the case of e.g. an incoming telephone call in FIG. 10 being placed from telephone terminal 121 with number "4001" located at Seat "B1" of Floor 2, Floor 2 being "Tokyo", to softphone 1022 with number "3001" on Floor 1 are explained in detail using FIG. 11. The functioning up to the incoming call side softphone 1022 receiving an INVITE command and acquiring the location ID of telephone terminal 121 on the outgoing call side is the same as in FIG. 8.

In FIG. 11, IP telephony server 100 receives an INVITE command from telephone terminal 121 on the outgoing call side (Process 1101), acquires the location ID of telephone terminal 121 on the outgoing call side from telephone terminal management table 103 (Process 1102), and transmits, by addition to the INVITE command, the acquired location ID to softphone 1022 on the incoming call side (Process 1103). If softphone 1022 on the incoming call side receives the INVITE command, it displays the location of telephone terminal 121 on the outgoing call side on a display or the like on the basis of the location ID, added to the INVITE command, of telephone terminal 121 on the outgoing call side (Process 1104).

The processes up to displaying the outgoing call side location on softphone 1022 on the incoming call side are the same as in FIG. 10. The process steps thereafter will below be described in detail. Softphone 1022 on the incoming call side, after displaying the location of the outgoing call side, reports the location ID to floor plan display part 1023 (Process 1105). In the present example, "Tokyo B1" is reported as the location ID. Next, floor plan display part 1023 reports the location ID to floor plan display server 1010 (Process 1106). In the present example, "Tokyo B1" is reported as the location ID.

Figure 17:
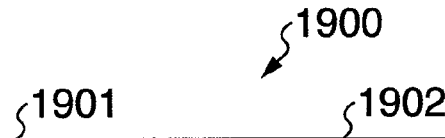
FIG. 17 is an example of a floor plan data storage table.
Figure 18:
FIG. 18 is an example of a coordinate storage table.

Subsequently, floor plan display server 1010, using the reported location ID, looks up the floor plan of the requested floor in a floor plan data storage table 1900 shown in FIG. 17 (Process 1107). The floor plan data storage table includes location IDs 1901 and floor plans 1902. In the present example, the floor plan data "Floor Tokyo" corresponding to the location ID "Tokyo B1" are looked up. Further, floor plan display server 1010, using the location ID and the floor plan data, looks up the coordinate data corresponding to the floor plan data of the location ID from a coordinate storage table 2000 in which there is stored information showing on which coordinates the floor plan data looked up with the location IDs shown in FIG. 18 are positioned. The coordinate storage table includes floor plans 2001, location IDs 2002, and coordinate data 2003.

In the present embodiment, the coordinate data are expressed in X coordinates and Y coordinates. Even over and above this, rectangular X coordinates and Y coordinates of the four corners of the room may be stored respectively in order to show the definite domain of floor plan data information. In this example, the coordinate data "(x1, y1)" corresponding to the floor plan data "Floor Tokyo" and the location ID "Tokyo B1" are looked up.

Next, the floor plan data and coordinate data looked up in Process 1107 are transmitted to floor plan display part 1023 (Process 1108). At the very end, floor plan display part 1023 displays the floor plan on a PC (Process 1109).

Figure 12:
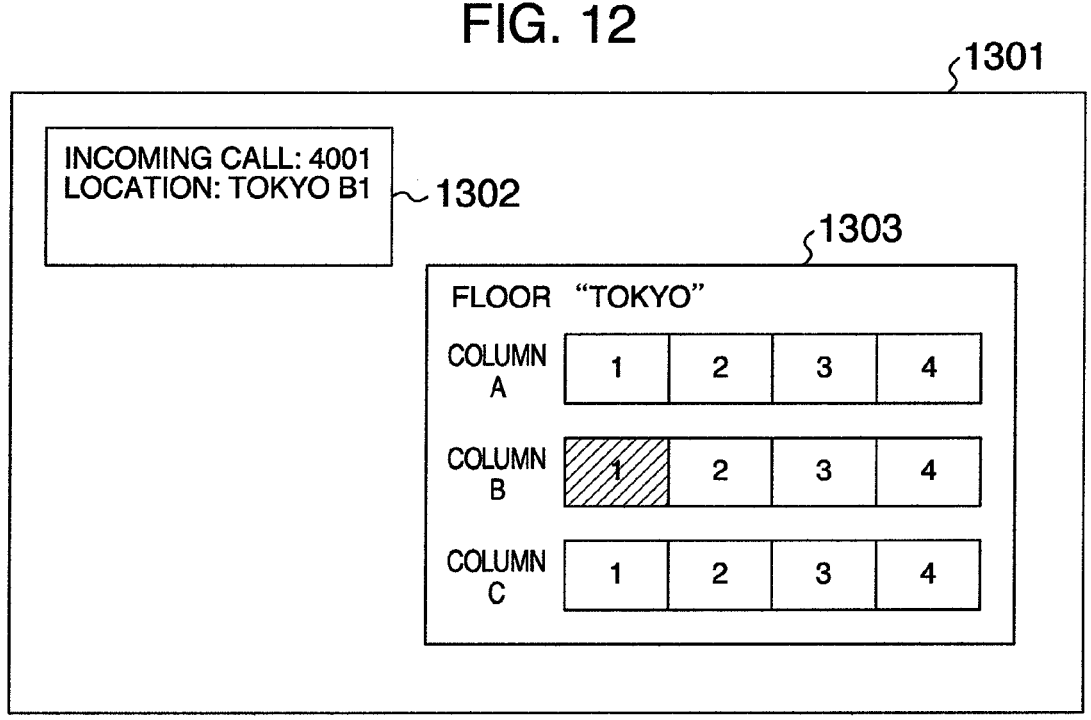
FIG. 12 is a PC screen display example when a softphone is receiving an incoming call.

In the aforementioned series of processes, when an incoming call side softphone 1022, with which it becomes possible to display a display screen 1301 such as exemplified in FIG. 12 on the screen of PC 1021, receives an incoming telephone call, the location ID of telephone terminal 121 on the outgoing call side is displayed to a telephone conversation correspondent display part 1302 on the screen of PC 1021 and it comes about that, as for telephone conversation correspondent position display part 1303, the plan of the floor where the telephone terminal on the outgoing call side is installed is visually displayed.

In the diagram, the location ID is "Tokyo B1" and in position display part 1303, the layout of "Floor Tokyo" is displayed and by changing the color of the coordinate "(x1, y1)" portion corresponding to the location ID "Tokyo B1", it is possible to visually present, with respect to the user, the seating location of the telephone conversation correspondent.

Also, the floor plan display server may also be a server capable of displaying the seating state of the same floor and in this case, it comes to be that, simultaneously with the incoming telephone call the seating state of the staff members is also displayed on the plan of the floor on which the telephone terminal on the outgoing call side is installed. According to the aforementioned embodiment, since the plan of the floor of the calling party is displayed simultaneously with the incoming telephone call, it comes to be that it is possible to carry on a conversation while feeling at ease as one confirms the location of the telephone conversation correspondent and the seating situation of the surroundings.

The present invention can be utilized with an IP telephony system. In particular, it is effective in the case of utilizing a telephone terminal such as a softphone or a portable wireless IP terminal, for which there is a possibility that the location of connection changes, and finding out the seating location thereof.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A call connection device coupled to a plurality of telephone terminals via a network, comprising:
a call connection part carrying out call connection processing between said plurality of telephone terminals;
a terminal registration part registering IP addresses of said plurality of telephone terminals;
a terminal location detection part detecting locations of said telephone terminals,
a relay device table storing information of a plurality of relay devices coupled to said telephone terminals, and
a port location table storing information of a plurality of ports which are mounted onto one of said plurality of relay devices for coupling to said telephone terminals;
wherein said call connection part receives a register command from one of said plurality of telephones, which includes a first IP address of said one of said plurality of telephone terminals;
wherein said port location table stores an identifier identifying a corresponding relay device, an identifier identifying a corresponding port, and positional information corresponding to said corresponding port;
wherein said terminal location detection part:
requests to said plurality of relay devices whose identifiers are stored in said relay device table as said identifier, a MAC address of said one of said plurality of telephone terminals based on said first IP address of said one of said plurality of telephone terminals;
requests, to a relay device which sends said MAC address of said one of said plurality of telephone terminals to said terminal location destination part, an identifier of a port which said one of said plurality of telephone terminals is coupled to based on said MAC address of said one of said plurality of telephone terminals in receiving said MAC address of said one of said plurality of telephone terminals from said relay device connected with said one of said plurality of telephone terminals, and
refers to said port location table based on said identifier of said port to acquire said positional information corresponding to said port which said one of said plurality of telephone terminals is coupled to in receiving said identifier of said port.

2. The call connection device according to claim 1, further comprising:
a telephone terminal management table which stores said first IP address and said positional information corresponding to said first IP address.

3. The call connection device according to claim 1, wherein said positional information is an information of installation location of said one of said plurality of telephone terminals.

4. The call connection device according to claim 2, wherein said register command further includes an extension number of said one of said plurality of telephone terminals, and wherein said telephone terminal management table further stores said extension number corresponding to said first IP address.

5. A call connection device coupled to a plurality of telephone terminals via a network, comprising:
a call connection part carrying out call connection processing between said plurality of telephone terminals;
a terminal registration part registering the IP addresses of said telephone terminals; and
a terminal location detection part detecting locations of said telephone terminals;
wherein said terminal location detection part comprises a relay device table storing information of a plurality of relay devices coupled to said telephone terminals and a port location table storing location information of a plurality of ports which are mounted onto one of said plurality of relay devices for coupling to said telephone terminals;
wherein said call connection part receives a register command from one of said plurality of telephones, which includes a first IP address of said one of said plurality of telephone terminals;
wherein said port location table stores an identifier identifying a corresponding relay device, an identifier identifying a corresponding port, and positional information corresponding to said corresponding port;
wherein said terminal location detection part:
requests to said plurality of relay devices whose identifiers are stored in said relay device table as said identifier, a MAC address of said one of said plurality of telephone terminals based on said first IP address of said one of said plurality of telephone terminals;
requests, to a relay device which sends said MAC address of said one of said plurality of telephone terminals to said terminal location destination part, an identifier of a port which said one of said plurality of telephone terminals is coupled to based on said MAC address of said one of said plurality of telephone terminals in receiving said MAC address of said one of said plurality of telephone terminals from said relay device connected with said one of said plurality of telephone terminals, and
refers to said port location table based on said identifier of said port to acquire said positional information corresponding to said port which said one of said plurality of telephone terminals is coupled to in receiving said identifier of said port.

6. The call connection device according to claim 5, wherein said relay device table stores an identifier identifying said relay device and the IP address corresponding to each of said plurality of relay devices.

7. The call connection device according to claim 5, further comprising:
a telephone terminal if management table which stores said first IP address and said positional information corresponding to said first IP address.

8. The call connection device according to claim 5, wherein said positional information is an information of installation location of said ore of said plurality of telephone terminals.

9. The call connection device according to claim 7 wherein said register command further includes an extension number of said one of said plurality of telephone terminals, and wherein said telephone terminal management table further stores said extension number corresponding to said first IP address.

10. A call connection device coupled to a plurality of telephone terminals via a network, comprising:
a call connection part carrying out call connection processing between said plurality of telephone terminals;
a terminal registration part registering IP addresses of said plurality of telephone terminals;
a terminal location detection part detecting locations of said telephone terminals, and
a management information memory storing information of a plurality of relay devices coupled to said telephone terminals, and information of a plurality of ports which are mounted onto one of said plurality of relay devices for coupling to said telephone terminals;

wherein said call connection part receives a register command from one of said plurality of telephones, which includes a first IP address of said one of said plurality of telephone terminals;

wherein said information of the plurality of ports stores an identifier identifying a corresponding relay device, an identifier identifying a corresponding port, and positional information corresponding to said corresponding port;

wherein said terminal location detection part:

requests to said plurality of relay devices whose identifiers are stored in said information of the plurality of relay devices as said identifier, a MAC address of said one of said plurality of telephone terminals based on said first IP address of said one of said plurality of telephone terminals;

requests, to a relay device which sends said MAC address of said one of said plurality of telephone terminals to said terminal location destination part, an identifier of a port which said one of said plurality of telephone terminals is coupled to based on said MAC address of said one of said plurality of telephone terminals in receiving said MAC address of said one of said plurality of telephone terminals from said relay device connected with said one of said plurality of telephone terminals, and refers to said information of the plurality of ports based on said identifier of said port to acquire said positional information corresponding to said port which said one of said plurality of telephone terminals is coupled to in receiving said identifier of said port.

11. The call connector device according to claim 10 further comprising:

a telephone terminal management table which stores said first IP address and said positional information corresponding to said first IP address.

12. The call connection device according to claim 10, wherein said positional information is an information of installation location of said one of said plurality of telephone terminals.

13. The call connection device according to claim 11, wherein said register command further includes an extension number of said one of said plurality of telephone terminals, and wherein said telephone terminal management table further stores said extension number corresponding to said first IP address.

* * * * *